(12) United States Patent
Felton

(10) Patent No.: US 7,819,237 B2
(45) Date of Patent: Oct. 26, 2010

(54) BELT SCRAPER TENSIONING ASSEMBLY

(75) Inventor: Jarrod J. Felton, Cyrus, MN (US)

(73) Assignee: Superior Industries, LLC, Morris, MN (US)

( * ) Notice: Subject to any disclaimer, the term of this patent is extended or adjusted under 35 U.S.C. 154(b) by 37 days.

(21) Appl. No.: 12/381,698

(22) Filed: Mar. 16, 2009

(65) Prior Publication Data

US 2010/0230241 A1 Sep. 16, 2010

(51) Int. Cl.
*B65G 45/00* (2006.01)
(52) U.S. Cl. ...................................... 198/499
(58) Field of Classification Search ................. 198/499
See application file for complete search history.

(56) References Cited

U.S. PATENT DOCUMENTS

| | | | |
|---|---|---|---|
| 4,402,394 A | 9/1983 | Stoll | |
| 4,795,024 A | 1/1989 | Eatwell | |
| 5,222,589 A | 6/1993 | Gordon | |
| 6,056,112 A | 5/2000 | Wiggins | |
| 6,283,274 B1 | 9/2001 | Dolan et al. | |
| 6,315,105 B1 | 11/2001 | Gibbs et al. | |
| 6,354,428 B1 | 3/2002 | Gibbs et al. | |
| 6,360,875 B1 | 3/2002 | Altemus, Jr. et al. | |
| 6,439,373 B1 | 8/2002 | Swinderman | |
| 6,575,292 B2 * | 6/2003 | Swinderman | 198/499 |
| 6,991,088 B1 * | 1/2006 | Smith et al. | 198/499 |
| 7,216,756 B2 | 5/2007 | Swinderman | |
| 7,549,532 B2 * | 6/2009 | Ostman | 198/499 |

OTHER PUBLICATIONS

ASGCO Manufacturing Inc: Complete Conveyor Components Brochure, (http:www.asgco.com/Tensioning.asp) Nov. 13, 2007 (3 pgs.).
Martin Engineering "MARTIN® XHD Tensioners Operator Manual", Dec. 3, 2003 (55 pgs.).

* cited by examiner

*Primary Examiner*—Joe Dillon, Jr.
(74) *Attorney, Agent, or Firm*—Dicke, Billig & Czaja, PLLC

(57) ABSTRACT

A belt scraper tensioning assembly attaches to a belt conveyor machine to bias a scraper blade toward a conveyor belt. The tensioning assembly is fully assembled prior to mounting to the belt conveyor. The tensioning assembly comprises a mounting plate with a central opening and a cylindrical bearing housing connected to the mounting plate coaxial with the central opening. A cylindrical bearing is positioned within the bearing housing. A tensioning arm extends radially from a cylindrical sleeve. A portion of the cylindrical sleeve is pivotally mounted within the cylindrical bearing. The cylindrical sleeve is positionable over and connectable to a shaft carrying a belt scraper such that the tensioning arm pivots as the shaft rotates. A stationery arm is connected to the mounting plate and extends along a horizontal axis of the mounting plate. The stationery arm includes an elongate slot. A tensioning rod extends through the elongate slot and has one end connected to the free end of the tensioning arm when the tensioning arm is angularly displaced less than 90 degrees from the stationery arm. A portion of the tensioning rod that extends below the stationery arm carries a spring between the stationery arm and a nut threaded on a lower end of the tensioning rod. The spring can be compressed to urge the tensioning arm toward the stationery arm and thereby rotate the belt scraper shaft to keep the belt scraper blade in close contact with the conveyor belt as the scraper blade wears.

1 Claim, 5 Drawing Sheets

BELT SCRAPER TENSIONING ASSEMBLY

BACKGROUND OF THE INVENTION

The present invention is directed to conveyor belt cleaning apparatus and more specifically to a tensioning assembly for maintaining close contact between a scraper blade of a conveyor belt cleaning apparatus and a conveyor belt of a belt conveyor machine. Belt conveyor machines are commonly used in the construction and mining industries to transport loose bulk material, such as sand, gravel, concrete, asphalt, coal, ore, waste, earth, etc. As the moisture content of the bulk material increases, there is a tendency for some of the material to stick to the conveyor belt. Conveyor belt cleaning apparatus typically comprise a scraper blade mounted on a pivotable shaft that is turn pivotably mounted near the return belt pulley of the conveyor machine. A tensioning mechanism associated with the shaft biases the scraper blade toward the conveyor belt to remove material from the belt before the return travel of the belt. Due to the abrasive nature of the bulk material being transported, over time the portion of the scraper blade in contact with the conveyor belt wears. The tensioning mechanism automatically adjusts the shaft as the scraper blade wears to keep the scraper blade adequately in contact with the conveyor belt to perform the belt cleaning function. Periodically, the belt cleaning apparatus requires servicing. There is a need for an improved tensioning mechanism for a belt cleaning apparatus that is easy to install and remove from the belt conveyor machine.

BRIEF SUMMARY OF THE INVENTION

The present invention pertains to a belt scraper tensioning assembly that is mountable to a shaft of a belt scraper assembly and to a mounting arm of a belt conveyor machine that supports the belt scraper assembly. The belt scraper tensioning assembly comprises a mounting plate, a bearing housing containing a cylindrical bearing, a tensioning arm, a tensioning rod assembly and a stationary arm. The mounting plate has a central opening and is configured for connection to the mounting arm. The bearing housing is connected to a planar surface of the mounting plate. The bearing housing has an inner cylindrical surface that is generally coaxial relative to the central opening of the mounting plate. The cylindrical bearing is positioned within the bearing housing in contact with the inner cylindrical surface. The tensioning arm has a first end and a second end. The first end of the tensioning arm is connected to and extends radially from an outer surface of a cylindrical sleeve. The cylindrical sleeve has a first cylindrical portion and a second cylindrical portion. The second cylindrical portion has an outer diameter that is less than the first outer cylindrical portion. The second cylindrical portion is positioned within the cylindrical bearing. The first and second portions of the cylindrical sleeve have an inner diameter sized to receive the shaft of the belt scraper assembly. The cylindrical sleeve further comprises means for connecting the cylindrical sleeve to the shaft. The stationery arm is connected to the planar surface of the mounting plate and extends away from the mounting plate along a horizontal axis of the mounting plate. The stationery arm is configured with an elongate slot that is spaced apart from the mounting plate. The tensioning rod assembly comprises an elongate rod that extends through the slot of the stationery arm and has a first end pivotally connected to the tensioning arm. A spring positioned over the elongate rod between the stationery arm and a second end of the elongate rod. Means are connected to the elongate rod near the second end for capturing the spring between the stationery arm and the second end of the elongate rod.

DETAILED DESCRIPTION OF THE INVENTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
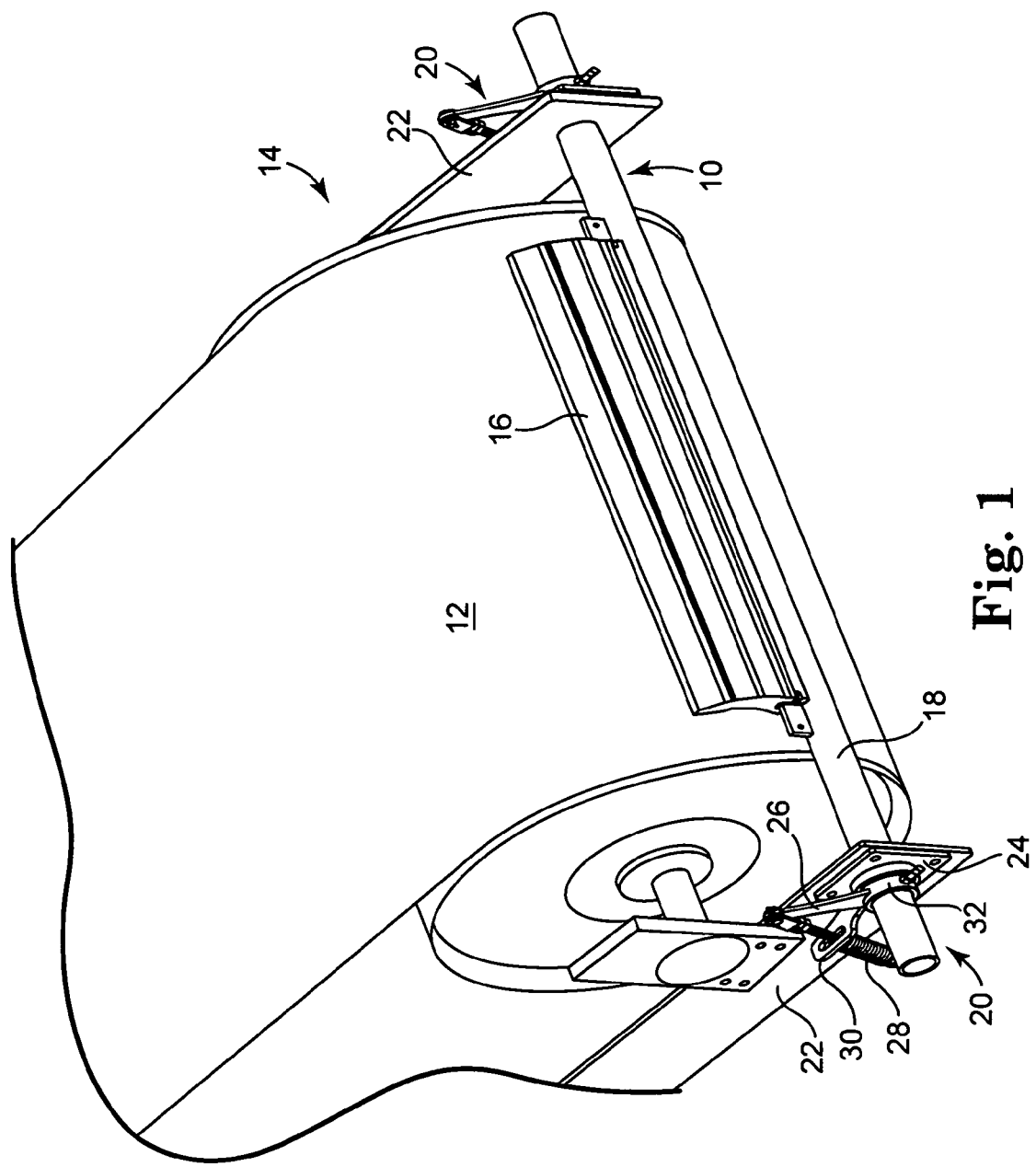
FIG. 1 is a perspective view of a belt scraper assembly for a belt conveyor mechanism.
Figure 2:
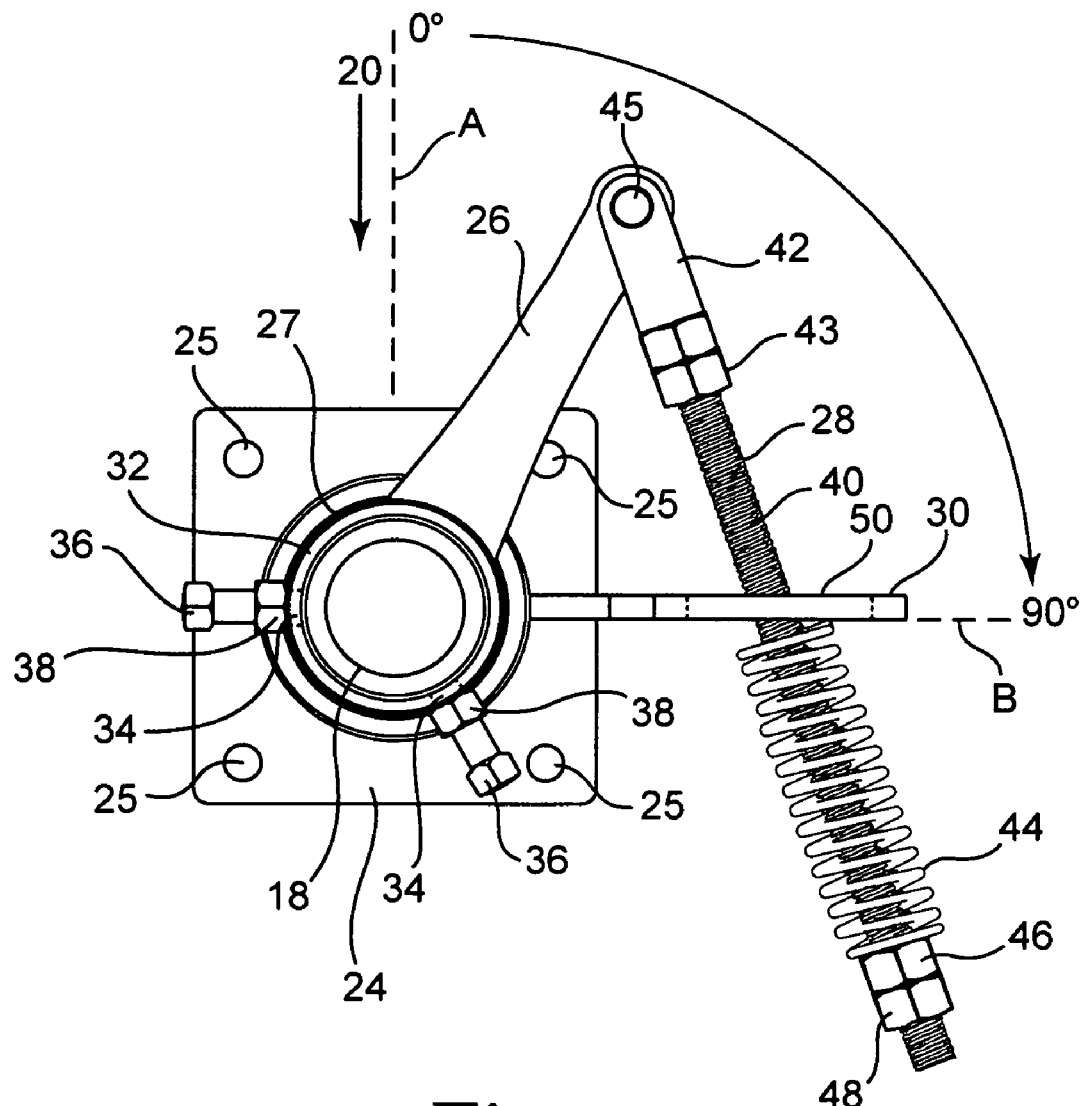
FIG. 2 is front elevation view of a belt scraper tensioning assembly of the present invention.
Figure 3:
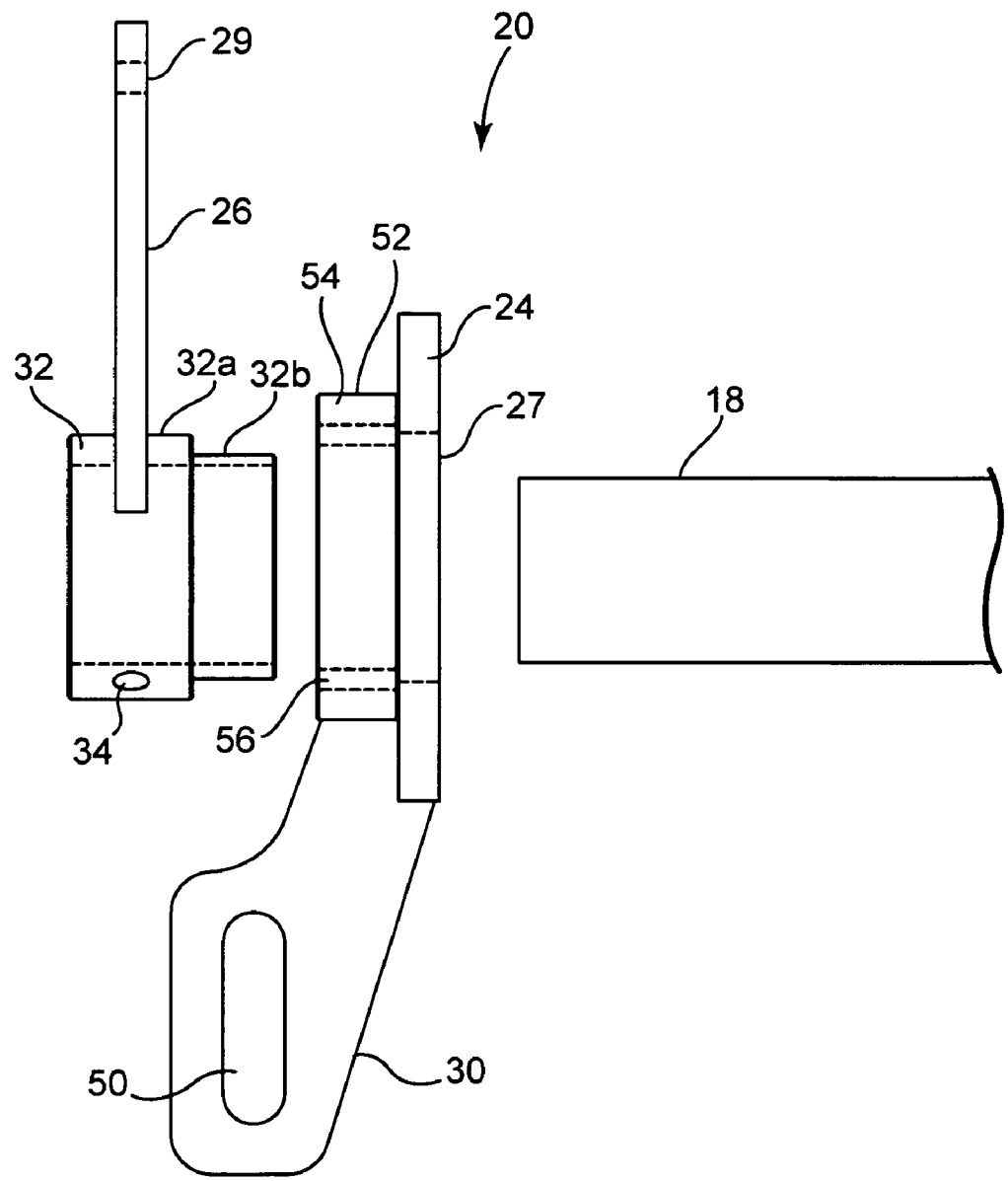
FIG. 3 is a top exploded view of a portion of the tensioning assembly of FIG. 2.

FIG. 1 is a perspective view of a belt scraper assembly 10 for cleaning a conveyor belt 12 on a belt conveyor machine 14. The belt scraper assembly 10 generally comprises a scraper blade 16, a shaft 18 which carries the scraper blade 16, and one or more tensioning assemblies 20 that are mounted on end portions of shaft 18 and secured to mounting arms 22 of the belt conveyor machine 14. As shown in FIGS. 1 and 2, each tensioning assembly 20 generally comprises a mounting plate 24, a tensioning arm 26, a tensioning rod assembly 28, and a stationary plate 30. In one embodiment, the mounting plate 24 is a generally square metal plate that carries the components of the tensioning assembly 20. Mounting plate 24 is provided with a plurality of radially spaced mounting holes 25 for attaching mounting plate 24 to mounting arms 22 with bolts via complimentary mounting holes formed in the mounting arms 22 (not shown). As shown in FIGS. 2 and 3, mounting plate 24 includes a generally central opening 27 having an inner diameter that is larger than an outer diameter of shaft 18, so as to allow shaft 18 to pass therethrough.

In one exemplary embodiment, tensioning arm 26 comprises a length of a planar metal material having one end connected to an outer surface of a cylindrical metal sleeve 32 and the opposite end configured with a hole 29 (FIG. 3) for connection to the tensioning rod assembly 28. Tensioning arm 26 extends radially from sleeve 32 in a first direction. Sleeve 32 has an inner diameter that is slightly larger than the outer diameter of shaft 18 so that sleeve 32 fits over shaft 18. Sleeve 32 is further provided with first and second threaded holes 34 through the cylindrical wall of sleeve 32 that are generally equally radially spaced from tensioning arm 26.

Holes 34 receive first and second threaded bolts 36 which function to secure sleeve 32 to shaft 18. Each bolt 36 is further provided with a locking nut 38 that is tightened against sleeve 32 after bolts 36 are threaded into frictional contact with shaft 18. With sleeve 32 secured to shaft 18, tensioning arm 26 thus pivots as shaft 18 is rotated. As shown in FIGS. 1 and 2, tensioning arm 26 is oriented at an angle of between 0 degrees and 90 degrees relative to a vertical axis A of mounting plate 24 and a horizontal axis B when scraper blade 16 is in contact with belt 12. As shown in FIG. 1, sleeve 32 is generally located adjacent to mounting plate 24.

Referring to FIG. 2, in one embodiment, tensioning rod assembly 28 comprises an elongate externally threaded metal rod 40, a clevis 42 at a first end of rod 40 and a metal spring 44 positioned over rod 40 and positioned near a second end of rod 40. In one embodiment, rod 40 has a length of about 12.0 inches. Clevis 42 is threaded onto the first end of rod 40 and may be secured thereto with a locking nut 43. Clevis is pivotally connected to hole 29 of tensioning arm 26 by a pin 45 which is retained therein by a cotter pin (not shown). In one embodiment, spring 44 is a metal spring having a length of about 5.0 inches and an outer diameter of about 1.25 inches. Spring 44 is retained on rod 40 by a threaded nut 46. A second locking nut 48 may also be provided adjacent to nut 46.

As shown in FIG. 2, the spring 44 of the tensioning rod assembly 28 is positioned between nut 46 and stationery plate 30 when tensioning assembly 20 is fully assembled. Stationery plate 30 comprises a planar metal plate that has a first end secured to mounting plate 24 such as by welding and a slot 50 near a second end, through which rod 40 extends. In one embodiment, stationery plate 30 is connected to an outer planar surface of mounting plate 24 generally intermediate the top and bottom edges of mounting plate 24. Stationery plate 30 extends from mounting plate 24 in a first direction that is generally coincident with axis B of mounting plate 24. Stationery plate 30 also extends from mounting plate 24 in a second direction so as to locate slot 50 in a plane that is generally common with tensioning arm 26. Slot 50 has a width that is greater than the diameter of rod 40 but less than the diameter of spring 44. Slot 50 has a length adequate to allow rod 40 a range of motion as tensioning arm 26 pivots toward the stationery plate 30 in response to wear of scraper blade 16.

Figure 4:
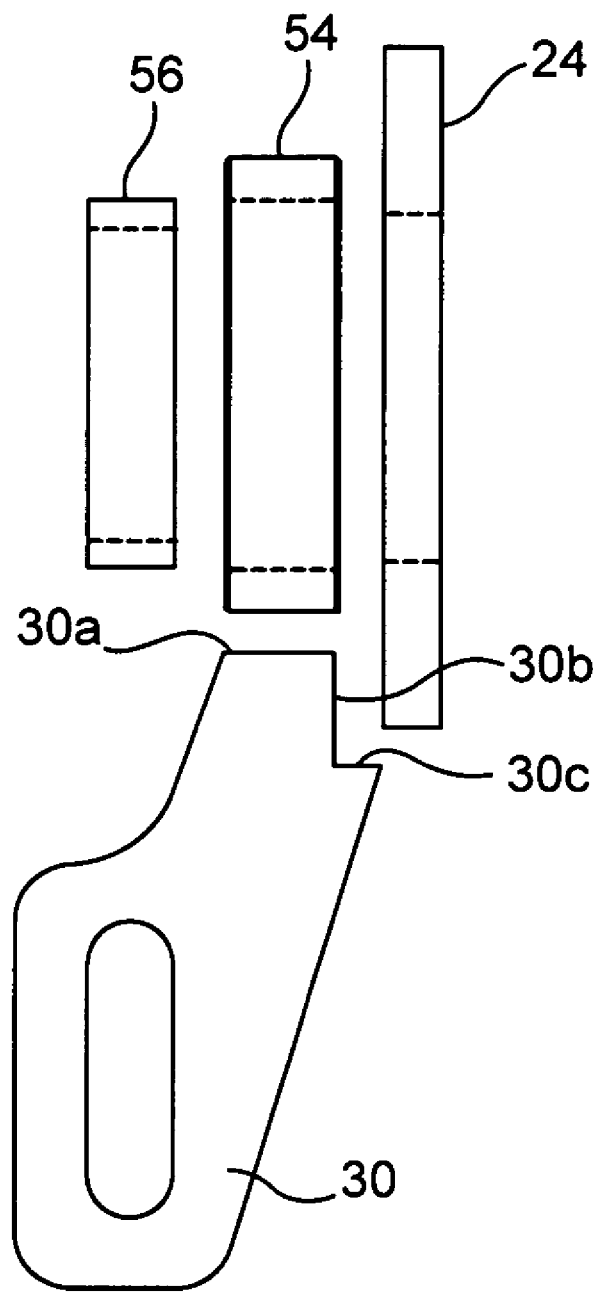
FIG. 4 is an exploded view of a mounting plate and a bearing plate of the tensioning assembly of the present invention.

FIG. 3 is a top exploded view of tensioning assembly 20. As shown in FIG. 3, mounting plate 24 further comprises a bearing assembly 52. Bearing assembly 52 is comprised of a cylindrical metal housing 54 and a cylindrical bearing 56 positioned within housing 54. Bearing 56 has an inner diameter that is greater than the outer diameter of shaft 18. In one embodiment, bearing 56 is a polymeric bearing sold under the brand name GARMAX®. As shown in FIGS. 3 and 4, housing 54 is secured to the outer planar surface of mounting plate 24 by welding so as to be coaxial with the central opening 27 of mounting plate 24. In the exemplary embodiment shown, stationery plate 30 is formed with edge surfaces 30a, 30b and 30c that mate with and are welded along the respective outer surfaces of housing 54 and mounting plate 24. Once stationery plate 30 and housing 54 are secured to mounting plate 24, bearing 56 is press fit into housing 54.

Referring again to FIG. 3, sleeve 32 of tensioning arm 26 comprises a first sleeve portion 32a and a second sleeve portion 32b which extends axially toward bearing 56. Second sleeve portion 32b is configured with a reduced outer diameter that is designed to fit closely within bearing 56 when tensioning assembly 20 is fully assembled so as to allow sleeve 32 to rotate relative to bearing 56. With second sleeve portion 32b positioned within bearing 56, tensioning arm 26 is generally positioned within a common plane with slot 50, which allows tensioning rod assembly 28 to be installed and connected relative to tensioning arm 26 and stationery plate 30, as previously described. With sleeve portion 32b positioned within bearing 56 and tensioning rod 28 secured to tensioning arm 26 and spring 44 captured between stationery plate 30 and nut 46, tensioning assembly 20 is fully assembled into a ready to install unit.

Figure 5:
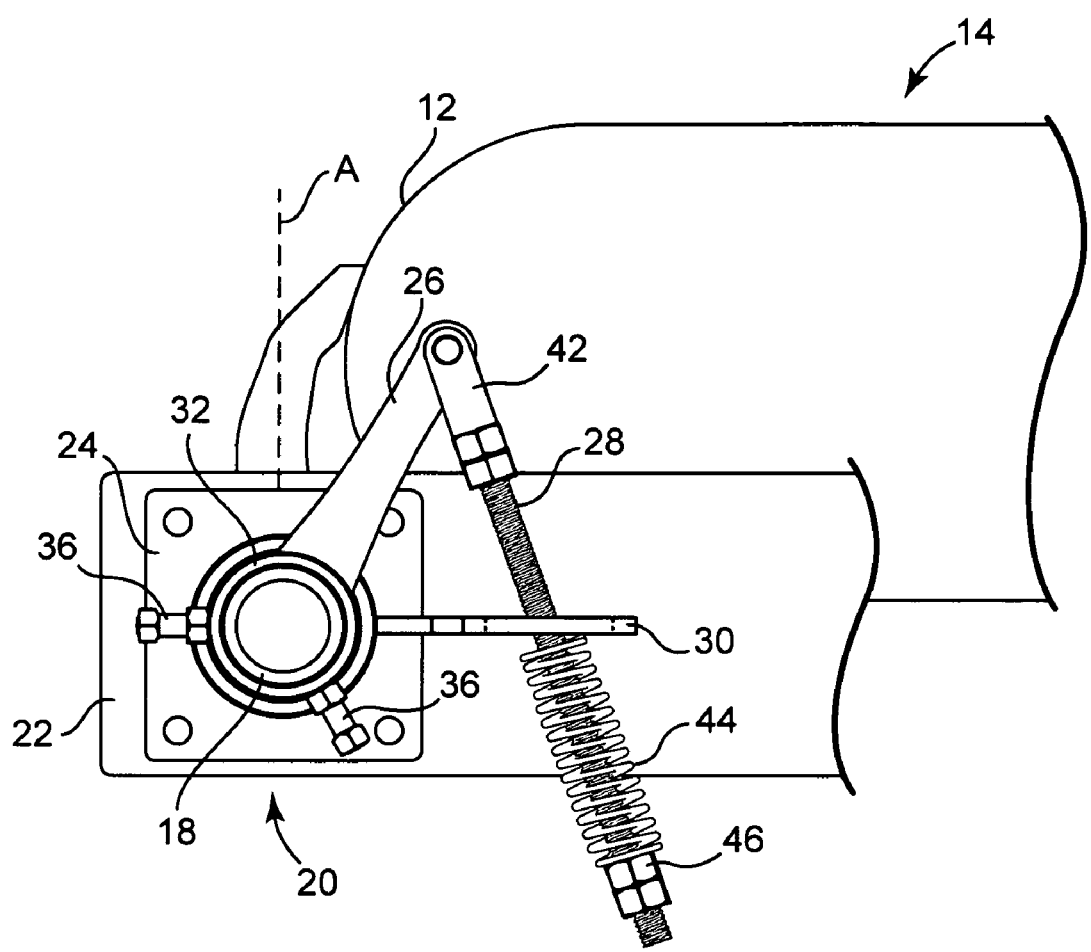
FIG. 5 is an end view of the belt scraper assembly of FIG. 1 with the scraper blade biased towards a conveyor belt by the tensioning assembly of the present invention.

As shown in FIG. 5, tensioning assembly 20 can be completely assembled prior to installation on shaft 18 and installed by sliding mounting plate 24 and sleeve 32 over the end of shaft 18 so that tensioning arm 26 is at an angle of between about 0 degrees and 90 degrees, and preferably between about 0 degrees and 45 degrees relative to axis A of mounting plate 24. Axis A is generally coincident with scraper blade 16. Mounting plate 24 is then bolted to a belt cleaner mounting arm 22 of a belt conveyor machine 14. Shaft 18 is then rotated to engage the scraper blade 16 against the conveyor belt 12. The bolts 36 of sleeve 32 are then threaded into engagement with shaft 18. Spring 44 is then compressed between stationery arm 30 and nut 46 by threading nut 46 toward the clevis 42. Spring 44 bears against the stationery arm 30 and thereby urges tensioning arm 26 in a direction toward stationery plate 30 which keeps scraper blade 16 against the conveyor belt 12 even as wear occurs to scraper blade 16 over time.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A belt scraper tensioning assembly mountable to a shaft of a belt scraper assembly and to a mounting arm of a belt conveyor, the belt scraper tensioning assembly comprising:

a mounting plate configured for connection to the mounting arm, the mounting plate having a central opening;

a bearing housing connected to a planar surface of the mounting plate, the bearing housing having an inner cylindrical surface that is generally coaxial relative to the central opening;

a cylindrical bearing positioned within the bearing housing in contact with the inner cylindrical surface;

a tensioning arm having a first end and a second end, the first end of the tensioning arm connected to and extending radially from an outer surface of a cylindrical sleeve, the cylindrical sleeve having a first cylindrical portion and a second cylindrical portion, the second cylindrical portion having an outer diameter that is less than the first outer cylindrical portion, the second cylindrical portion positioned within the cylindrical bearing, the first and second portions of the cylindrical sleeve having an inner diameter sized to receive the shaft of the belt scraper assembly, the cylindrical sleeve comprising means for connecting the cylindrical sleeve to the shaft;

a stationery arm connected to the planar surface of the mounting plate and extending away from the mounting plate along a horizontal axis of the mounting plate, the stationery arm configured with an elongate slot, the elongate slot spaced apart from the mounting plate; and
a tensioning rod assembly comprising an elongate rod extending through the slot of the stationery arm and having a first end pivotally connected to the tensioning arm and a second end, a spring positioned over the elongate rod between the stationery arm and the second end of the elongate rod, means connected to the elongate rod near the second end for capturing the spring between the stationery arm and the second end of the elongate rod.

* * * * *